United States Patent [19]

Sartulairi

[11] Patent Number: 4,890,653

[45] Date of Patent: Jan. 2, 1990

[54] DISTRIBUTOR PERMITTING DISTRIBUTION OF DOSES OF LIQUID AND INTENDED FOR USE AS A BEVERAGE DISTRIBUTOR

[76] Inventor: René Sartulairi, Villa Le Gingko - Avenue de Latécoére, 31700 Cornebarrieu, France

[21] Appl. No.: 152,117

[22] Filed: Feb. 4, 1988

[30] Foreign Application Priority Data

Feb. 4, 1987 [FR] France .................. 87 01883

[51] Int. Cl.⁴ .................. B65B 3/18; F04B 35/02; A47J 31/40
[52] U.S. Cl. .................. 141/82; 417/402; 141/359; 141/231; 99/280; 99/323.3
[58] Field of Search .................. 141/351, 352, 354, 359, 141/192, 198, 231, 82; 417/401, 402, 435, 384, 386, 398–402; 222/382, 385, 146.5, 334, 383, 146.2, 146.5; 99/280, 281, 282, 283, 289 R, 323.3

[56] References Cited

U.S. PATENT DOCUMENTS

| | | | |
|---|---|---|---|
| 2,744,469 | 5/1956 | Schaefer | 417/435 |
| 3,228,571 | 1/1966 | O'Donnell et al. | 222/385 |
| 3,270,918 | 9/1966 | Goodrich et al. | 222/146.5 |
| 3,356,011 | 12/1967 | Parraga | 99/289 |
| 3,661,305 | 5/1972 | Frahm et al. | 222/481 |
| 4,150,769 | 4/1979 | James | 222/334 |
| 4,389,925 | 6/1983 | Piana | 99/295 |
| 4,739,904 | 4/1988 | Spencer et al. | 222/481 |

FOREIGN PATENT DOCUMENTS

512276 11/1930 Fed. Rep. of Germany ........ 99/283

Primary Examiner—Henry J. Recla
Assistant Examiner—J. Casimer Jacyna
Attorney, Agent, or Firm—Harold H. Dutton, Jr.

[57] ABSTRACT

A beverage distributor, particularly for use in an aircraft and comprising a storage receptacle (1), a pump (11) provided with the dosing chamber (11b) and a moveable member (12), an actuator for the moveable member, a withdrawal conduit (13) connected to the dosing chamber (11b) and the bottom of the receptacle, and a liquid distribution conduit (16); two unidirectional valves (14, 17), at pressure thresholds Po and Pi, interposed respectively in the withdrawal conduit (13) and the distribution conduit (16), a first communication line (18a, 18b) between the interior and exterior of the receptacle (1), associated with a closure (12c) for closing the first communication line in the top position of the moveable member (12) and permitting introduction of free air into the receptacle in the other positions of this member, and a second communication line (36, 37) between the interior and the exterior of the receptacle, and provided with a unidirectional valve (36) of a pressure threshold Pc, such that $Ph < Pc < Po + Pi$, where Ph represents the hydrostatic pressure of the liquid in an inclined position of the receptacle.

16 Claims, 6 Drawing Sheets

DISTRIBUTOR PERMITTING DISTRIBUTION OF DOSES OF LIQUID AND INTENDED FOR USE AS A BEVERAGE DISTRIBUTOR

The present invention relates to a dispenser which allows distribution of doses of a liquid, especially beverages. This distributor is intended to be used in particular, but not exclusively, as a dispenser for beverages in an airplane.

BACKGROUND AND OBJECTS OF THE INVENTION

Dispensers for fresh or hot beverages permitting delivery of a dose of the selected beverage to the interior of a goblet, glass or cup are quite commonly used in many public places. However, none of these dispensers satisfy the safety standards required in order to be used on board an aircraft. These safety requirements dictate that all apparatus used presents no risk of that the liquid that it contains might be spilled on the interior of the aircraft, under any circumstances. In reality, there do not exist any type of distributor or dispenser capable of fulfilling these conditions.

The object of the present invention is to fill this gap, and to provide a beverage dispenser meeting all of the safety standards required permitting transport on board an aircraft for distributing fresh or hot beverages.

Another object of the invention is to permit the distribution of hot beverages at a temperature which remains essentially constant for several hours, without the need of reheating of the liquid during flight.

DESCRIPTION OF THE INVENTION

To this end, the distributor which is the object of the invention is of the type comprising:

a sealed storage vessel, a pump provided with a body comprising a dosing chamber and a member moveable on the interior of the dosing chamber in such a manner as to cause variation in the capacity thereof, means for actuating the moveable member capable of moving the member between two extreme positions, termed top and bottom positions and corresponding respectively to the maximum and minimum capacities of the dosing chamber, withdrawal conduit means connected to the dosing chamber and the bottom of the vessel, and distribution conduit means connected to the dosing chamber for dispensing the liquid.

According to the present invention, the dispenser is characterized in that it comprises:

a unidirectional or one-way withdrawal valve having an opening threshold pressure Po, interposed in the withdrawal conduit and adapted to open communication from the storage vessel toward the dosing chamber under the effect of reduced pressure in said chamber during displacement of the moveable member toward its top position, a unidirectional or one-way distribution valve, at an opening threshold pressure Pi, interposed in the distribution conduit and adapted to open said conduit under the effect of the overpressure existing in the dosing chamber at the time of displacement of the moveable member toward its bottom position, first communication means between the interior and exterior of the vessel adapted to empty above the maximum liquid level, closing means for said first communication means, controlling the moveable member, in such a manner as to close said first communication means in the top position of said moveable member and to assure admission of free air into the vessel at the other positions of said moveable member, communication means between the interior and exterior of the vessel, termed second communication means, adapted to empty above the maximum liquid level and being provided with a unidirectional valve, termed safety valve, at a threshold pressure Pc, adapted to permit introduction of free air into the vessel when the vessel is subjected to an overpressure greater than a threshold Pc determined such that:

$$Ph < Pc < Po + Pi$$

where Po and Pi represent the opening pressure thresholds of the distribution withdrawal valves, and Ph represents the hydrostatic pressure of the liquid at the level of the safety valve in a recumbent position of the vessel.

Further, when the dispenser is used in an aircraft, the liquid receptacle is dimensioned in such a manner as to offer a capacity greater than the maximum number n of doses of liquid to be distributed between two refillings of the vessel or two landings of the aircraft.

The different means described above cooperate to assure an absolute safety with respect to pouring of the liquid or spilling of the liquid from of the receptacle. In effect:

the introduction of free air into the vessel, necessary for the correct operation of the pump, is cut off in the top position of the piston: thus, the liquid may not spill at the time of a fall, drop or overturning of the dispenser.

During the climb to altitude upon pressurization of the cabin, the safety valve permits maintaining a constant pressure difference between the vessel and the cabin. Further, the opening of this valve permitting achieving this equilibrium carries with it uniquely the evacuation of vapors, and not liquid, it being understood that the communication means empties into the vessel above the maximum liquid level.

Additionally, the pressure threshold Pc of opening of this safety valve being less than the sum of Po and Pi of the pressure threshold of the withdrawal and distribution valves, the opening of this safety valve necessarily intervenes before the eventual opening of the withdrawal and distribution valves. No accidental outflow of liquid due to the opening of these two valves is to be feared.

It should be noted that conditions are the same when placement at temperature of the liquid while the distributor is used for distributing heating beverages.

Further, the pressure threshold Pc of opening of the safety valve is provided to be greater than the hydrostatic pressure of the liquid in a lying down position of the vessel. Thus, even if the distributor is accidentally inverted, this valve remains closed. Once again, this arrangement permits avoidance of any spilling of the liquid from the vessel.

The first communication means between the interior and the exterior of the vessel permitting introduction of free air therein during actuation of the piston, preferably comprises at least two passages arranged on the body of the pump and adapted to communicate respectively with the interior and exterior of the vessel. The moveable member itself comprises a piston which also forms a closure means and presents a form adapted to cut off communication in the top position and assure introduction of free air in the vessel for the other positions of the piston.

A preferred embodiment thus comprises using a pump supported on an upper or top wall of the vessel and adapted in such a manner as to partially project to the exterior of the vessel, the pump having the following characteristics:

the body of the pump comprises two superimposed compartments termed top and bottom of different interior diameters, the bottom compartment being of a greater diameter and comprising the dosing chamber and disposed on the interior of the vessel, and the top compartment having at least a portion thereof external to the vessel, the passages comprise simple orifices arranged in each compartment and emptying respectively to the interior and exterior of the vessel, the piston comprises two piston heads, termed upper and lower, of diameters conjugate to those of the compartments, the head of the bottom piston being adapted to slide in the dosing chamber provided with sealing means able to close off communication between the orifices, in the top position of the piston.

Further, the distributor comprises, preferably, and in a conventional manner, a niche for goblets. According to one characteristic of the invention, the communication means between the interior and exterior of the vessel is thus provided in such a manner as to discharge into this niche into the goblets. The condensates may thus be directed toward a recovery bottle connected to this niche, in such a manner as to avoid a diffusion of even a minor amount of vapor to the interior of the cabin.

According to another characteristic of the invention, the piston actuating means comprises:

pneumatic feed means adapted to cause a displacement of the piston toward its bottom position, elastic return means adapted to cause the return of the piston toward its top position, means for interrupting the pneumatic feed adapted to cut off this feed in the bottom position of the piston, pneumatic fluid distribution means for controlling interruption means and adapted to permit a discharge of a fluid toward the piston when the interruption means is opened, and an evacuation of this fluid when the interruption means is closed.

This actuating means has the advantage of permitting an automatic operation of the distributor while using, for example, a feed means comprising a compressed air bottle integrated with the interior of the distributor. Thus, for example, and as will be explained further hereinafter, the placing at temperature or heating of the liquid necessary for the distribution of the warm beverages is achieved before departure of the aircraft with the distributor for reasons of safety. This distributor is therefore completely autonomous and needs not to be connected to any exterior feed source.

Other characteristics, objects and advantages of the invention will become apparent from the description which follows, in reference to the accompanying drawings which present by way of non-limiting example, a preferred embodiment.

DESCRIPTION OF THE DRAWINGS

In the drawings, which form an integral part of the present description.

DETAILED DESCRIPTION OF PREFERRED EMBODIMENTS

The distributor according to the invention is intended to be arranged on a cart, in order to permit the dispensing of warm beverages throughout the interior of an aircraft.

The distributor comprises a sealed storage receptacle 1, externally insulated by means of a material 2 such as "Eccofoam" foam. This receptacle 1 is provided with a filling stopper 3 in the upper part and an emptying stopcock 4 in the bottom part. Further, a graduated level tube 5 visible from the exterior indicates the level of liquid in the interior of the receptacle. This level tube is, further, provided with graduations indicating the minimum and maximum levels to be maintained for reasons explained hereinafter.

In the receptacle 1 is provided a resistance heater 6 arranged in such a manner as to heat the liquid in the lower part of the receptacle. The electric feed for the resistance 6 is controlled by a thermostat 7 connected in such a manner as to raise the temperature of the liquid essentially at half the height of the receptacle and for turning off the electric feed at a temperature of approximately 80° C., less than the boiling point of water under the conditions of flight at high altitude.

Figure 6:
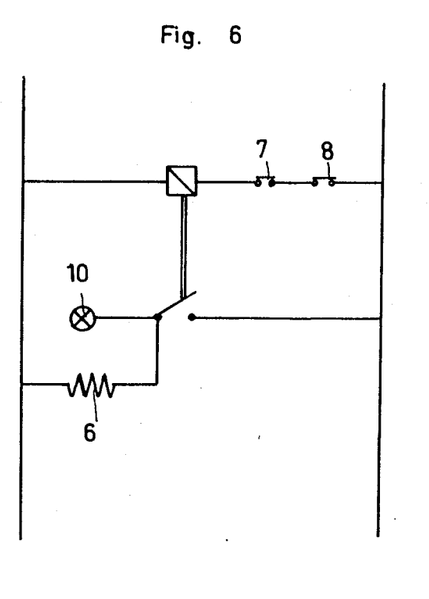
FIG. 6 is a schematic view of the principle of the electric feed circuit for the distributor.

In addition, an electric level sensor 8 is connected in the electric feed circuit and is adapted, as indicated in FIG. 6, to open this circuit and therefore interrupt the heating if the level of liquid is less than the minimum level previously indicated.

The function of this level sensor 8 is to avoid supplying current to the resistance heaters when they are not immersed, which would cause a risk of damage thereto.

The electric feed circuit is connected to current supply terminals 9 accessible from the front wall of the distributor. The heating of the liquid may thus be carried out before placing the distributor in the aircraft for obvious reasons of safety. A heating indicator 10 permits, finally, to signal the end of the heating.

The dispensing of doses of beverage is assured by a pump 11 provided with a dosing chamber 11b and fixed on the upper wall of the distributor. On the interior of this pump slides a piston 12 adapted to be displaced between a top position corresponding to the maximum capacity of the dosing chamber 11a and a bottom position corresponding to the minimum capacity of this chamber.

During rising of the piston 12, the liquid is aspirated from the bottom of the receptacle through a conduit 13 connected to the bottom of the receptacle and to the chamber 11b. This conduit is, further, provided at the level of its lower extremity with an inlet check valve 14 having an opening pressure threshold Po, and adapted to open the communication of the receptacle 1 toward the chamber 11b, under the effect of the reduced pressure existing in this chamber as the piston rises. This pressure threshold is, in the example, determined in such a way as to permit opening of the valve 14 for a pressure drop of 30 millibars.

It should be noted that the water drawn in from the bottom of the receptacle 1, during the first distributions, is at a temperature on the order of 60° C. which is less than the temperature of the liquid as detected by the thermostat 7 which is, itself, essentially equal to 80° C. This phenomenon is due to the fact that the liquid heated by the resistance heater 6, arranged in the bottom of the receptacle 1, has a tendency to rise naturally in this vessel. The thermostat 7 positioned halfway up in the receptacle thus interrupts the heating when the liquid in the bottom of the receptacle is still only at a temperature of about 60° while the liquid farther up in the receptacle is hotter.

Far from presenting a disadvantage, this phenomenon permits, on the contrary, to distribute heated beverages at a temperature which is essentially constant for several hours. In effect, at the time of the first distributions, the liquid withdrawn is reheated as it passes upwardly through the conduit 13 through the warmer liquid to be finally distributed at a temperature on the order of 65° C.

By reason of the heat losses, the temperature of the liquid contained in the receptacle 1 diminishes with time; the heat exchange between the liquid contained in the receptacle 1 and the liquid flowing in the conduit 13 become less important and the temperature of the fluid dispensed remains essentially constant.

For example, by means of a foam insulation 2 such as "Eccopoam" determining a temperature loss on the order of 2° C. per hour, the temperature of the dispensed liquid remains constant on the order of 65° C., for approximately five hours.

When the piston 12 falls, the liquid is forced toward a goblet niche 15 opening at the front wall of the distributor and connected to the dosing chamber 11b, by a conduit 16. This conduit is, as before, provided with a one way distribution valve 17 having an opening threshold pressure Pi, adapted to open communication between the chamber 11b toward the goblet niche 15 under the effect of greater pressure in this chamber. This pressure threshold is, in the example, determined so as to permit an opening of the valve for an overpressure of 50 millibars.

Figure 1:
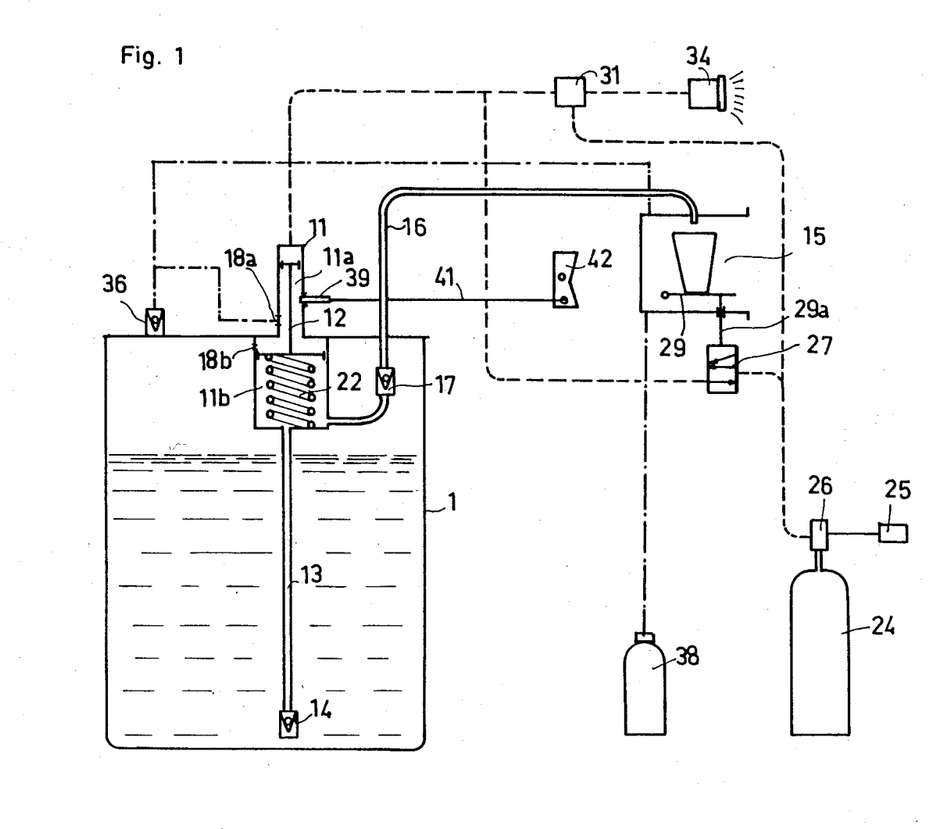
FIG. 1 is a schematic view of illustrating the principle of the operation of a dispenser or distributor according to the invention.
Figure 2:
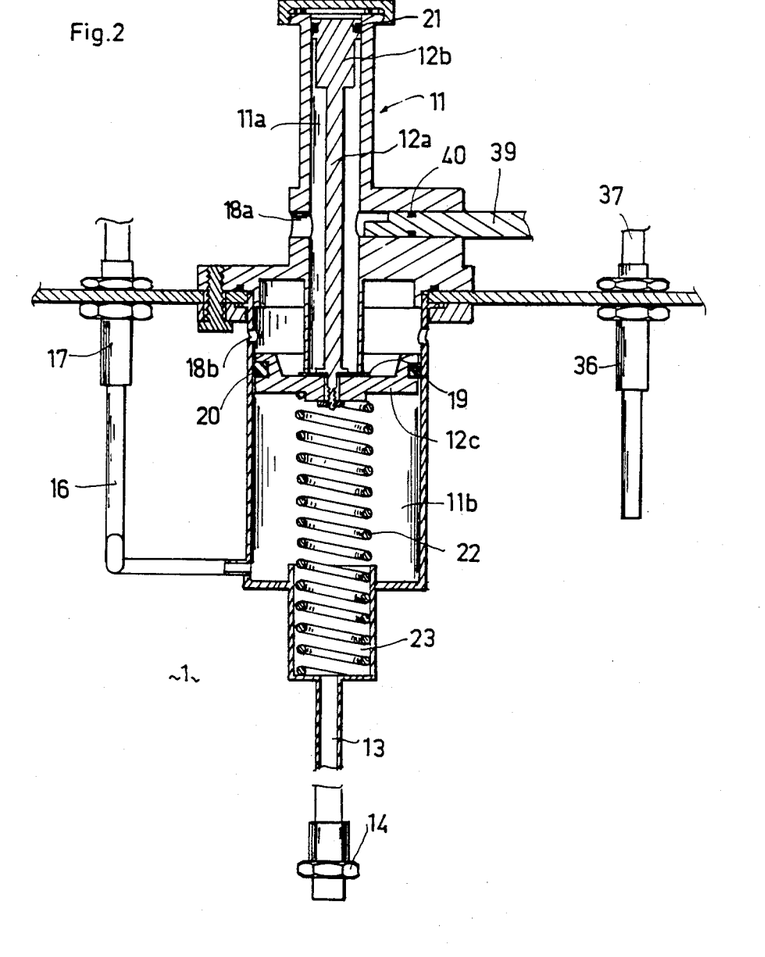
FIG. 2 is a longitudinal cross section of the pump used in this distributor.
Figure 3:
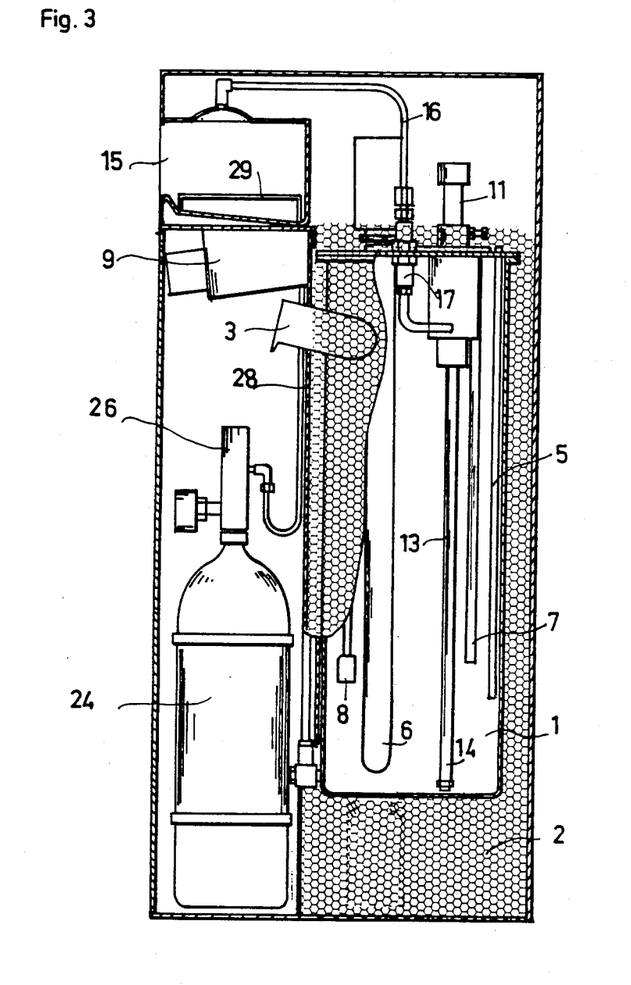
FIG. 3 is a longitudinal view partially in cross section of the interior of the distributor.
Figure 4:
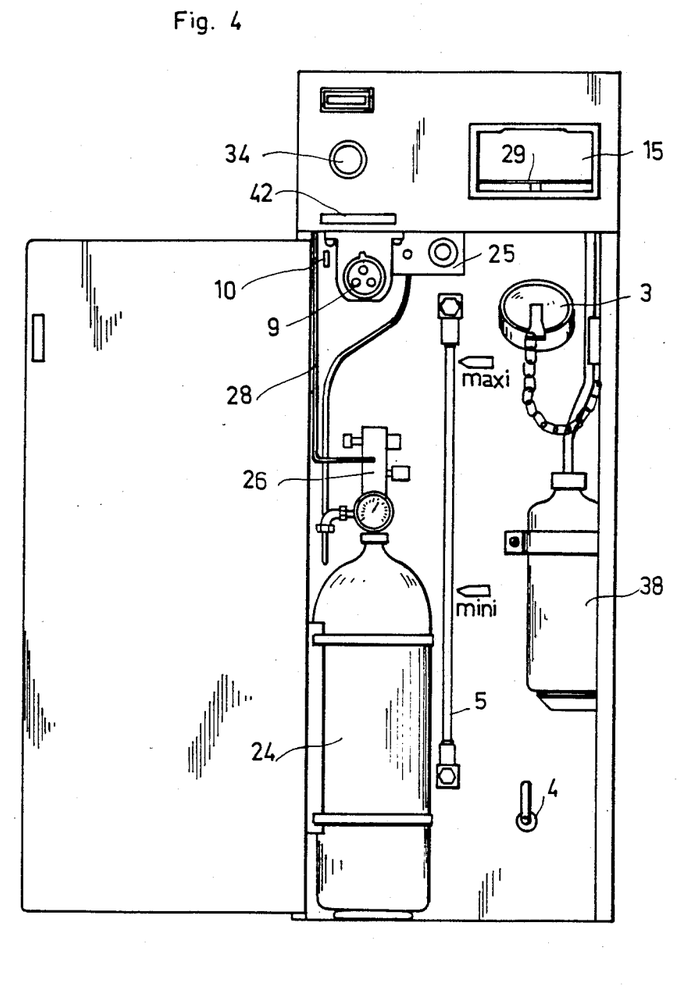
FIG. 4 is a front plan view of the dispenser, the access door being in the open position.
Figure 5:
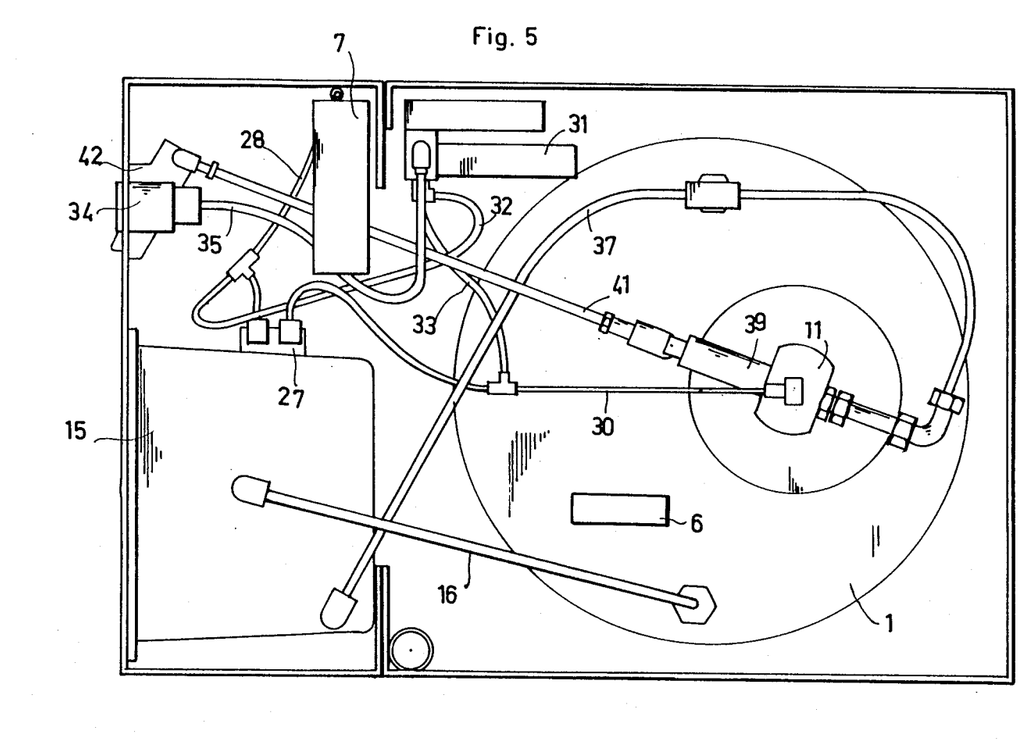
FIG. 5 is a top plan view with the upper wall removed.

The pump 11 essentially has the peculiarity of being divided into two superposed compartments, upper and lower, 11a, 11b of different diameters, the upper compartment 11a extending to the interior of the lower compartment 11b; the lower compartment 11b, is of a greater diameter and comprises in itself the dosing chamber. This pump is, furthermore, arranged on the upper wall of the distributor, in such a manner that the dosing chamber 11b is positioned on the interior of the receptacle 1 while the upper compartment 11a projects partially above the receptacle 1.

The piston 12 comprises a piston body 12a of a diameter less than those of the compartments 11a, 11b. This body connects two piston heads 12b and 12c of diameters adapted to be able to slide each in one of the compartments 11a, 11b.

The travel of the piston 12 is therefore determined by the travel of the head of the bottom piston 12c which comes, into upper abutment, in contact with the lower extremity of the upper compartment and, in lower contact, rests against the bottom of the dosing chamber.

Communication means 18a, 18b permits, further, assuring the placement of free ambient air in the receptacle 1 during an actuation of the piston 12. This communication means comprises orifices 18a, 18b provided in each compartment 11a, 11b and opening directly either into the receptacle 1 or to the exterior of this receptacle 1.

These orifices are used respectively in the portion of the upper compartment, exterior to the receptacle 1 and in the portion of the lower compartment 11b situated below the upper stop of the head of the piston 12c. This piston head 12c is further provided with a sealing joint or packing 19 arranged in such a manner to be interposed between the head of the piston and the lower extremity of the upper compartment 11a in order to cut off communication between the orifices 18a, 18b in the top position of the piston 12.

Finally, each of the heads of the piston 12b, 12c is provided with an annular seal or O-ring joint 20, 21 for assuring a seal between the compartments 11a, 11b.

The actuating means for the piston comprises pneumatic feed means permitting displacement of the piston toward its bottom position and elastic return means permitting the return of the piston toward its top position.

This elastic return means comprises a spring 22 arranged in a cylindrical portion 23, provided in the lower extension of the dosing chamber 11b and provided with an orifice for communication with the withdrawal conduit. This spring 22 is thus compressed by the head of the lower piston 12c during descent of the piston 12 and enables return of the piston toward its upper position.

Figure 7:
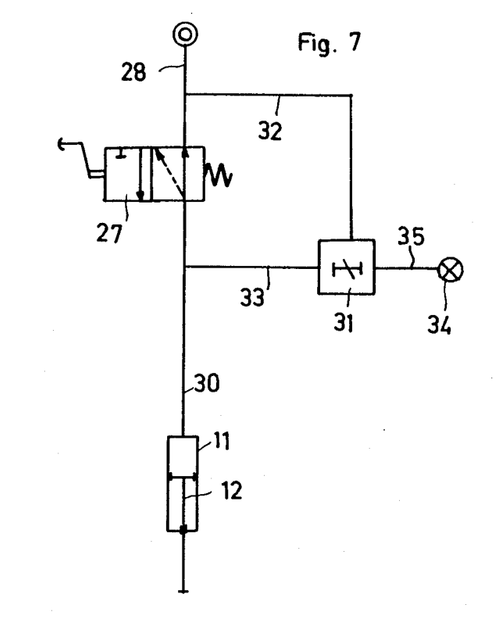
FIG. 7 is a schematic view of the pneumatic feed circuit of the distributor.

The pneumatic feed means comprises a compressed air bottle 24 provided with a high pressure self-closing connection 25 permitting its refilling and pressure reduction valve 26 permitting lowering the pressure of the fluid to on the order of five bars.

This fluid is directed by means of a conduit 28 toward a pneumatic distributor 27 having a fluid inlet connected to this conduit 28, a feed outlet connected to compartment 11a of the pump 11 by means of a conduit 30, and an evacuation outlet permitting the evacuation of air contained in the compartment 11a and the conduit 30 when the piston 12 rises.

The switching of the distributor 27 between its two states is achieved by means of a control member 29a fixed to a flexible support plate 29 arranged in the goblet niche 15 and intended to support the goblets or cups.

The placing of a goblet on the plate 29 causes in effect a deformation of the support plate 29 and the switching, by the intermediary of the control member 29a of the distributor 27 toward the position where it permits feeding the pump 11. The removal of the goblet causes, on the contrary, the return of the support plate 29 toward its initial position and the switching of the distributor 27 toward its position where it permits evacuation of fluid, and consequently, the rising of the piston 12 under the action of the spring 22.

A pneumatic delay switch 31 also permits delivering a signal at the end of the dispensing. This switch 31 is connected firstly, upstream of the distributor 27 by means of a conduit 32 and, downstream of this distributor by means of a conduit 33. This delay switch 31, being activated when its two terminals are fed, is influenced only after a goblet is placed in the niche 15. After an appropriate time interval, at least equal to the time required by the piston 12 to be displaced from its upper position toward its lower position, the delay switch 31 feeds a pneumatic signal 34 by means of a conduit 35. This signal of the end of the dispensing permits the user to withdraw the goblet and thus provoke the switching of the pneumatic distributor 27.

Another essential component of this beverage dispenser comprises a one way valve 36, termed a safety valve, at an opening pressure threshold Pc, interposed in the communication means between the interior and exterior of the receptacle 1 adapted to empty above the maximum level of the liquid.

This safety valve 36 is adapted to permit an out let to ambient air from the receptacle 1 when the latter is subjected to a pressure rise greater than the threshold pressure Pc mentioned above and determined in such a manner that:

$$Ph < Pc < Po + Pi$$

where Po and Pi represent the opening pressure thresholds of the distribution valve 17 and the withdrawal valve 14, Ph represents the hydrostatic pressure of the liquid in the laying or overturned position of the receptacle 1.

These imperatives have lead to the choice of a value of Pc equal to 40 millibars determined as a function of the diameter of the receptacle 1 which, in the example is 200 mm, and values of Po (50 millibars) and Pi (30 millibars).

This choice has as its goal to cause this security valve 36 to assume a triple role:

maintenance of a constant pressure difference between the receptacle 1 and the cabin of the aircraft, imperative release of the valve 36 before opening of the distribution valve 17 and discharge valve 14, in such a manner as to avoid any spilling of the liquid toward the goblet niche 15 upon a rise in pressure in the vessel or receptacle 1, maintaining this valve 36 in a closed position in the case in which the receptacle 1 is accidentally found in a reclined or overturned position.

Further, this safety valve 36 as well as the orifice 18a permitting release to ambient air from the receptacle 1 are connected to the goblet niche 15 by means of a conduit 37. Thus, vapors escaping from the receptacle, generally when raising the temperature of the liquid, may be recovered in a condensate recovery bottle 38 connected to this niche 15.

Finally, the distributor comprises a selection member permitting eventually limiting the travel of the piston 12 in order to deliver reduced quantity of liquid. This selection member comprises a pointer 39 moveable between two positions:

one position where it projects to the interior of a compartment 11a, 11b where it serves as an intermediate stop of a piston head 12b, 12c in order to deliver a dose of liquid less than the maximum capacity of the dosing chamber 11b, one position where it is retracted out of the compartment in such a manner as to permit a displacement of the piston 12 to its bottom position.

In the example, this selection pointer 39 is positioned at the level of a portion of the upper compartment 11a exterior to the receptacle 1. It may thus be actuated directly by means of a shaft 41 connected, at the level of the wall above the distributor, to an operating button 42, which is actuated manually.

Further, this selection pointer 39 is provided with an annular O-ring joint 40 maintaining the seal of the pump 11.

The different members comprising this beverage dispenser having been described, its operation will be better understood with the help of the description which follows.

Initially, the liquid is brought to the desired temperature before the distributor is operated. During this operation, an increase in volume of a liquid may only bring about an opening of the safety valve 36 and, consequently, an evacuation of vapor recovered in the bottle 38. After departure and during pressurization of the cabin, the safety valve 36 permits maintaining a constant pressure difference between the receptacle 1 and the cabin. Further, the piston 12 being in the upper position, no emptying of liquid is to be feared even in the case where the distributor is accidentally turned over.

The dispensing of beverages then requires selecting the desired quantity of liquid, and then placing a goblet in the niche 15 on the support plate 29.

This simple action brings about a change in the state of the pneumatic distributor 27 and, consequently, pneumatic feed of the pump 11 and of the delay switch 31.

The displacement of the piston 12 then permits assuring introduction of ambient air into the receptacle 1. It should be noted further, that an eventual deterioration of the seal joint 21 of the head of the top piston 12b has as its only effect to bring about a discharge of fluid across the orifice 18a and does not cause an increase in the pressure in the receptacle 1.

The end of the dispensing signaled by the pneumatic indicator 34 indicates that one may withdraw the goblet from the niche 15. This withdrawal automatically causes a change of state of the pneumatic distributor and, as a result, the return of the piston 12 toward its top position under the action of the spring 23 and simultaneously the refilling of the dosing chamber.

This beverage dispenser is thus entirely automatic once placed in the airplane. Moreover and especially, the association of the three one way valves 14, 17, 36 and closing means permitting, in the upper position of the piston 12, closing of the free air inlet to the receptacle 1, permits guaranteeing against any risk of having the liquid accidentally spilled in the interior of the aircraft.

While this invention has been described as having certain preferred features and embodiments, it will be understood that it is capable of still further variation and modification without departing from the spirit of the invention, and this application is intended to cover any and all variations, modifications, and adaptations of the invention as fall within the spirit of the invention and the scope of the appended claims.

I claim:

1. A distributor permitting dispensing of doses of liquids and intended for use as a beverage dispenser comprising a sealed storage receptacle (1) a pump (11) comprising a body having a dosing chamber (11b) and a member (12) moveable in the interior of said chamber in such a manner as to vary the capacity of said dosing chamber, means (22, 24, 26–35) for actuating said moveable member (12) between top and bottom extreme positions corresponding respectively to maximum and minimum capacities of said dosing chamber (11b), withdrawal conduit means (13) connected to said dosing chamber (11b) and the bottom of said receptacle (1), distribution conduit means (16) connected to said dosing chamber (11b) for dispensing liquid, a one way withdrawal valve (14) at a pressure threshold Po, interposed in said withdrawal conduit (13) and adapted to open communication from said receptacle to said dosing chamber under the effect of reduced pressure in said dosing chamber upon displacement of said moveable member (12) toward its top position, a unidirectional distribution valve (17) having an opening threshold pressure Pi interposed in said distribution conduit (16) and adapted to open said conduit under the effect of overpressure existing in said dosing chamber (11b) at the time of displacement of said moveable member (12) toward its bottom position, a first communication means (18a, 18b) for establishing fluid communication between the interior and exterior of said receptacle and positioned so as to open above the maximum liquid level in said receptacle, closure means (12c) for said first communication means (18a, 18b) controlled by said moveable member (12), in such a manner as to close said first communication means in the top position of said moveable member and to assure introduction of free air into said receptacle for other positions of said moveable member, second communication means (36, 37) between the interior and exterior of said receptacle (1) adapted to open above the maximum liquid level in said receptacle and provided with a one way safety valve (36) at a pressure threshold Pc adapted to permit an outlook to ambient air from said receptacle when said receptacle is subjected to greater than the threshold pressure Pc determined such that:

$$Ph < Pc < Po + Pi$$

where Po and Pi are the threshold opening pressures of said distribution valve (17) and said withdrawal valve (14) and, Ph is the hydrostatic pressure of the liquid at the level of the safety valve (36) in a reclined position of said receptacle (1).

2. A distributor as in claim 1 for use as a beverage distributor in an aircraft, adapted to permit distribution of a maximum number n of liquid doses between two landings in which said receptacle (1) has a capacity greater than the number n of doses.

3. A distributor as in claim 2 and wherein said receptacle includes a top wall and said pump (11) is supported on said top wall and arranged in such a manner as to partially project to the exterior of said receptacle, said distributor being characterized in that said body of said pump comprises top and bottom compartments (11a, 11b) superposed and of different internal diameters, said bottom compartment (11b) being of a greater diameter and comprising said dosing chamber, and being disposed on the interior of said receptacle (1) and said top compartment comprising at least a portion exterior to said receptacle (1), said passages (18a, 18b) comprising orifices provided in each compartment (11a, 11b) and emptying respectively to the interior and the exterior of said receptacle (1), said piston (12) comprising top and bottom heads (12b, 12c) of diameters conjugate to those of said compartments (11a, 11b), said bottom piston head (12c) being arranged to slide in said dosing chamber (11b), and being provided with seal means (29) for closing communication between said orifices (18a, 18b) in said top position of said piston (12).

4. A distributor as in claim 3 and wherein said top compartment (11a) extends to the interior of said dosing chamber (11b) so as to serve as a stop for the head of said bottom piston (12c), in the top position of said piston (12), each orifice (18a, 18b) provided in said dosing chamber (11b) being constructed opposite said portion of said top compartment (11a) emptying into said chamber (11b), said seal means comprising a seal joint (19) connected to the head of the bottom piston (12c) and arranged so as to be positioned between said piston head and the extremity of the top compartment (11a) in the top position of the piston (12).

5. A distributor as in claim 4 and wherein said two piston heads (12b, 12c) are connected by means of a body (12a) of a diameter less than the diameter of said compartments (11a, 11b).

6. A distributor as in claim 5 and including a selection member (31) including a pointer moveable between two positions, a first position for emptying to the interior of one compartment (11a, 11b) and serving as an intermediate stop for said piston head (12b, 12c) for delivering a dose of liquid less than the maximum capacity of said dosing chamber (11a, 11b) and a second position retracted to the exterior of the compartment so as to permit a displacement of the position to its bottom position.

7. A distributor as in claim 4 and where in the head of said top piston (12b) is provided with seal means (21) for avoiding infiltration of fluid to the interior of the body of said pump.

8. A distributor as in claim 1 and wherein said moveable member (12) of said pump (11) comprises a piston of a cross section conjugate to that of said dosing chamber (11b) for sliding within the interior of said dosing chamber for discharging a dose of liquid upon its displacement toward its bottom position and for aspirating a dose of liquid into said dosing chamber (11b) upon its displacement toward its top position.

9. A distributor as in claim 8 and wherein said first communication means comprises at least two passages (18a, 18b) on the body of said pump and adapted for communication respectively with the interior and the exterior of said receptacle (1), the piston (12) being of a form such as to cooperate with said closing means and close communication in said top position and insure introduction of free air into said receptacle for other positions of said piston.

10. A distributor as in claim 8 and wherein said actuating means for said piston comprises pneumatic feed means (24, 26) for causing a displacement of said piston (12) toward said bottom position, elastic return means (22) for causing return of said piston (12) toward said top position, interruption means (29, 31–35) for said pneumatic feed means and adapted to said pneumatic feed in the bottom position of the piston, pneumatic fluid distribution means (27, 28, 30) controlled by interruption means (29, 31–35) and adapted to permit flow of fluid toward the piston (12) when the interruption means is open, and evacuation of the fluid when the interruption means is closed.

11. A distributor as in claim 10 and including a goblet niche (15), said pneumatic distribution means including a pneumatic distributor (27) having an inlet connected to feed means (24, 26), a feed outlet connected to the pump (11) and an evacuation outlet emptying to free air, said interruption means comprising a flexible support plate (29) on the interior of said goblet niche (15) and adapted to support a goblet when placed in said niche, a control member (29a) connecting said support plate (29) and said pneumatic distributor (27) and arranged in such a manner as to be actuated upon placement or removal of a goblet whereas to position said distributor in a position permitting flow of fluid between said pneumatic feed means (24, 26) and said pump (11) after placement of a goblet on said support plate (29), and in a position permitting evacuation of fluid across said evacuation outlet after removal of a goblet, and delay means (31) adapted to provide a signal at the end of distribution to a signalling device (34) after a predetermined time interval, consecutive to placement of a goblet, said time interval at least equal to the time required by the piston (12) to be displaced from its top position toward its bottom position.

12. A distributor as in claim 11 and wherein said delay means comprises a pneumatic delay member (31) adapted to be activated upon placement of a goblet in said niche (15), in such a manner as to feed after said predetermined time interval, said signalling means comprising a pneumatic signal (34).

13. A distributor as in claim 12 and wherein said means for communication between the interior and the exterior of said receptacle (1) is arranged so as to empty at the level of said goblet niche (15), said distributor comprising a condensate recovery bottle (38) connected to said niche.

14. A distributor as in claim 1 for the distribution of a liquid, said distributor comprising insulation means (2) for said storage receptacle (1), heating means (6) for said liquid and a thermostat (7) for stopping said heating means (6) at a predetermined temperature of the liquid.

15. A distributor as in claim 14 and wherein said heating means comprises electrical resistance heaters (6) arranged near the end of the receptacle, the thermostat (7) being disposed essentially at mid height of said receptacle.

16. A distributor as in claim 15 and comprising an electric level sensor (8) for turning off electric feed to said resistance heaters (6) when the liquid level in the interior of said receptacle is below a minimum predetermined level.

* * * * *